(12) United States Patent
Tanaka et al.

(10) Patent No.: US 8,657,914 B2
(45) Date of Patent: Feb. 25, 2014

(54) EXHAUST GAS PURIFYING FILTER

(75) Inventors: Masamichi Tanaka, Tokyo (JP);
Atsushi Kishimoto, Tokyo (JP); Tadashi Neya, Tokyo (JP); Keita Ishizaki, Utsunomiya (JP)

(73) Assignees: Sumitomo Osaka Cement Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/499,015

(22) PCT Filed: Sep. 30, 2010

(86) PCT No.: PCT/JP2010/067138
§ 371 (c)(1),
(2), (4) Date: Mar. 29, 2012

(87) PCT Pub. No.: WO2011/040563
PCT Pub. Date: Apr. 7, 2011

(65) Prior Publication Data
US 2012/0186212 A1    Jul. 26, 2012

(30) Foreign Application Priority Data
Sep. 30, 2009  (JP) .................. 2009-228766

(51) Int. Cl.
*B01D 39/06* (2006.01)
*B01D 39/14* (2006.01)
*B01D 39/20* (2006.01)
*B01D 24/00* (2006.01)
*B01D 59/50* (2006.01)
*B01D 50/00* (2006.01)

(52) U.S. Cl.
USPC .............. 55/524; 55/522; 55/523; 55/486; 422/169; 422/170; 422/171; 422/172; 422/177; 422/178; 422/179; 422/180; 422/181; 422/182

(58) Field of Classification Search
USPC .................. 55/522–524, 486; 422/169–172, 422/177–182
See application file for complete search history.

(56) References Cited

U.S. PATENT DOCUMENTS

| 5,198,007 | A  | * | 3/1993 | Moyer et al. ............. 55/523 |
| 7,179,430 | B1 | * | 2/2007 | Stobbe et al. ........... 422/180 |
| 8,361,399 | B2 | * | 1/2013 | Mizuno et al. .......... 422/177 |

(Continued)

FOREIGN PATENT DOCUMENTS

| JP | 02-002845 A | 1/1990 |
| JP | 02-004413 A | 1/1990 |

(Continued)

OTHER PUBLICATIONS

International Search Report for International Application No. PCT/JP2010/067138 (Jan. 18, 2011) with English translation.

(Continued)

*Primary Examiner* — Amber Orlando
(74) *Attorney, Agent, or Firm* — Squire Sanders (US) LLP

(57) ABSTRACT

There is provided an exhaust gas purifying filter, which includes an inflow surface into which exhaust gas including particulate matter flows, an exhaust surface from which purified gas is exhausted, and a filter substrate which is constructed of a porous body, the filter substrate including a porous partition and a gas passage which is enclosed by the porous partition, a porous film which includes silicon carbide is provided on a surface of the porous partition, and in a pore diameter distribution of the porous film, pores with the pore diameter of 0.01 μm or more and 3.0 μm or less are 70% or more of total volume of the pores, and pores with the pore diameter of 0.01 μm or more and 0.3 μm or less are 5% or more and 90% or less of total volume of the pores.

5 Claims, 3 Drawing Sheets

(56) References Cited

U.S. PATENT DOCUMENTS

| | | | |
|---|---|---|---|
| 8,388,721 B2* | 3/2013 | Ishizawa | 55/523 |
| 2004/0191133 A1* | 9/2004 | Yamaguchi | 422/180 |
| 2005/0074374 A1* | 4/2005 | Ogura | 422/180 |
| 2005/0207946 A1* | 9/2005 | Asano et al. | 422/177 |
| 2008/0264010 A1* | 10/2008 | Mizuno et al. | 55/350.1 |
| 2010/0126133 A1* | 5/2010 | Fekety et al. | 55/523 |
| 2010/0135866 A1* | 6/2010 | Mizuno et al. | 422/180 |
| 2012/0107203 A1* | 5/2012 | Arnold et al. | 423/213.5 |

FOREIGN PATENT DOCUMENTS

| | | |
|---|---|---|
| JP | A-05-023512 | 2/1993 |
| JP | A-09-077573 | 3/1997 |
| JP | A-2007-022822 | 2/2007 |
| JP | A-2007-252997 | 10/2007 |
| JP | T-2008-537510 | 9/2008 |
| JP | 2009-240878 A | 10/2009 |
| JP | A-2010-269268 | 12/2010 |
| JP | 5338603 B2 | 8/2013 |
| WO | WO 2009/133857 A1 | 11/2009 |

OTHER PUBLICATIONS

Notice of Allowance dated Dec. 3, 2013 corresponding to Japanese Patent Application No. 2011-534329 and English translation thereof.

* cited by examiner

EXHAUST GAS PURIFYING FILTER

This application is a U.S. National Stage Application under 35 U.S.C. §371 of International Patent Application No. PCT/JP2010/067138, filed 30 Sep. 2010, which claims the benefit of priority to Japanese Patent Application No. 2009-228766 filed 30 Sep. 2009, the disclosures of all of which are hereby incorporated by reference in their entireties. The International Application was published in Japanese on 7 Apr. 2011 as WO 2011/040563.

TECHNICAL FIELD

The present invention relates to an exhaust gas purifying filter for removing particulate matter from exhaust gas which is discharged from a diesel engine or the like of an automobile.

BACKGROUND

Various materials which are contained in exhaust gas which is discharged from a diesel engine of an automobile are a cause of air pollution, and have generated various environmental problems until now. Particularly, it is said that particulate matter (PM) which is contained in the exhaust gas is a cause of the occurrence of allergic symptoms such as asthma or hay fever.

In general, in a diesel engine for an automobile, a sealing type ceramic honeycomb structure (DPF: Diesel Particulate Filter) is used in order to collect the particulate matter. In the honeycomb structure, both ends of a cell (gas passage) of the ceramic honeycomb structure are sealed in a checker pattern, and particulate matter is collected when the exhaust gas passes through micropores in partitions of the cell (for example, refer to PTLs 1 and 2).

CITATION LIST

Patent Literature

[PTL 1] JP-A-05-23512
[PTL 2] JP-A-09-77573

SUMMARY OF INVENTION

Technical Problem

However, since particulate matter is always discharged from the engine when driving an automobile, the particulate matter is deposited in layers at the micropores and on the micropores of the partitions of the honeycomb structure. In this way, if the particulate matter is deposited in layers at the micropores and on the micropores of the partitions of the honeycomb structure, eventually all surfaces of the partitions are covered with the particulate matter, and the filter function is damaged. In addition, since pressure loss is increased due to the fact that the particulate matter is deposited in layers and a so-called "clogged" state is generated, a load in the driving of the automobile is generated. Thereby, it is necessary to regenerate (decrease the pressure loss) the honeycomb structure by regularly removing the particulate matter through one method or another.

Therefore, in the related art, in order to remove the particulate matter, the temperature of the ceramic honeycomb structure is increased by injecting fuel and increasing the temperature of the exhaust gas, an operation referred to as a "regeneration" is performed by burning the deposited particulate matter, and the pressure loss of the exhaust gas purifying filter is decreased.

However, in this regeneration method, the particulate matter is burned at high temperature of 600° C. to 700° C. and is burned at higher temperature in the initial time of the regeneration. Therefore, in the ceramic honeycomb structure, the partitions are easily damaged by a thermal stress generated at this time. Thus, it is necessary to shorten the time in which the thermal stress is applied in order to prevent damage to the partitions.

As a method which shortens the time in which the thermal stress is applied, there is a method which decreases the amount of the particulate matter which is processed at one time by decreasing the deposited amount of the particulate matter. However, in this method, the frequency of the combustion and regeneration cycle of the particulate matter is increased and the efficiency is deteriorated. In addition, since the fuel which is used in this method does not contribute to the driving of the automobile at all, the fuel which is used for the combustion is increased if the frequency of the regeneration processing is increased, which adversely affects fuel consumption.

Therefore, the frequency of the reproduction processing is increased and the efficiency of the ceramic honeycomb structure is not used at 100%. Thus, an exhaust gas processing filter which is not easily damaged due to the heat stress and can shorten the regeneration time is required.

The present invention is made with consideration for the above-described problems; it is possible to prevent the temperature of the ceramic honeycomb structure from being suddenly increased and the honeycomb structure from being damaged by suppressing runaway in an initial combustion when regenerating the ceramic honeycomb structure in which the particulate matter is deposited on the partition while suppressing an increase in the pressure loss. In addition, it is possible to shorten the combustion time of the particle matter which is deposited on the partition. Since the deposition amount through the collection of the particulate matter can be increased, the interval of the combustion and regeneration cycle can be lengthened. The use amount of the fuel needed for the increase and maintenance of the exhaust gas temperature even in a single combustion interval can be decreased. Thereby, an object of the present invention is to provide an exhaust gas purifying filter capable of improving fuel consumption by preventing damage to the ceramic honeycomb structure, decreasing use of the fuel needed for a single fuel consumption and the regeneration, and lengthening the interval in the combustion and regeneration cycle.

Solution to Problem

In order to solve the above-described problems, there is provided an exhaust gas purifying filter which includes an inflow surface into which exhaust gas including particulate matter flows, an exhaust surface which exhausts purified gas, and a filter substrate which is configured of a porous body, in which the filter substrate includes a porous partition and a gas passage which is enclosed by the partition, and a porous film which includes silicon carbide is provided on a surface of the partition, and in a pore diameter distribution of the porous film, pores with the pore diameter of 0.01 μm or more and 3.0 μm or less are 70% or more of total volume of the pores, and pores with the pore diameter of 0.01 μm or more and 0.3 μm or less are 5% or more and 90% or less of total volume of the pores.

In the present invention, it is preferable that the porous film be provided so as to cover a hole portion and a solid portion of the partition in the inflow surface, and a thickness of the porous film be 60 μm or less in a position which is planarly overlapped with the hole portion in the inflow surface and be 5 μm or more in a position which is planarly overlapped with the solid portion in the inflow surface.

In the present invention, it is preferable that the surface of the porous film be provided in a uniform state.

In the present invention, it is preferable that an average porosity of the porous film be 50% or more and 90% or less.

Advantageous Effects of Invention

The exhaust gas purifying filter of the present invention includes the inflow surface into which the exhaust gas including the particulate matter flows, the exhaust surface which exhausts the purified gas, and the filter substrate which is configured of a porous body, in which the filter substrate includes a porous partition and a gas passage which is enclosed by the partition, and the porous film which includes the silicon carbide is provided on a surface of the partition, in the pore diameter distribution of the porous film, pores with the pore diameter of 0.01 μm or more and 3.0 μm or less are 70% or more of total volume of the pores, and pores with the pore diameter of 0.01 μm or more and 0.3 μm or less are 5% or more and 90% or less of total volume of the pores.

Thereby, the collected particulate matter is collected on the surface of the porous film without penetrating the inner portion of the partition of the filter substrate, and therefore, clogging of the partition can be prevented. As a result, it is possible to suppress the increase in the pressure loss while maintaining collection efficiency of the particulate matter. Particularly, it is possible to suppress an increase ratio in the pressure loss according to deposition of the particulate matter at the time of use to be lower.

In addition, thermal runaway due to the combustion of the particulate matter at the time of regenerating the filter is suppressed and a sudden temperature increase of the filter substrate is prevented. Therefore, it is possible to prevent damage of the filter. Moreover, as a result, it is possible to decrease load to an automobile when the automobile is driven.

In addition, an interval of the regenerating cycle of the filter can be lengthened, and the regeneration frequency can be decreased.

In addition, at the time of regeneration of the filter, combustion gas for burning the particulate matter uniformly contacts the particle matter on the porous film, a heat exchange between the porous film and the combustion gas passing through the porous film is effectively operated, and the particulate matter can be burned and removed in a short period of time.

Therefore, in the automobile on which the exhaust gas purifying filter of the present invention is mounted, the pressure loss is suppressed and the filter can be generated in a short period of time without being damaged. As a result, it is possible to improve fuel consumption.

Moreover, due to the fact that the pore distribution is within the range of the present invention, small pores and large pores coexist in the porous film, and as a result, strength of the film is enhanced, and a film which can withstand practical use even in the film having high porosity can be formed.

DETAILED DESCRIPTION

Hereinafter, an exhaust gas purifying filter of the present invention will be described with reference to FIGS. 1 to 3. Moreover, this form is specifically described in order to better understand the gist of the present invention and is not particularly limited except as otherwise noted. Moreover, in order to clarify the drawings in all drawings below, the film thickness or the size ratio of each component, or the like is appropriately different.

[Exhaust Gas Purifying Filter]

Figure 1:
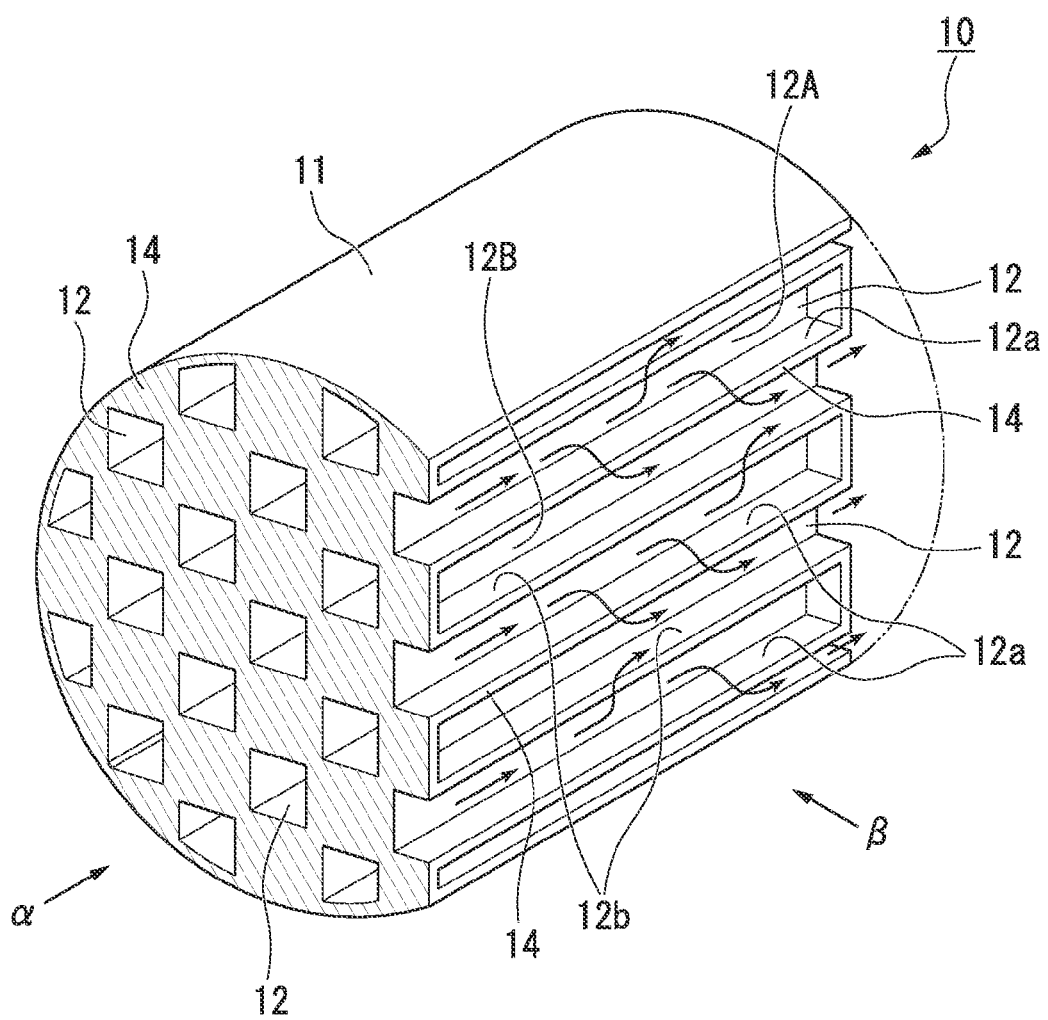
FIG. 1 is a partially cut away perspective view showing a honeycomb structure type filter of an embodiment of the present invention.

FIG. 1 is a schematic perspective view showing a partial cross-section of an embodiment of an exhaust gas purifying filter of the present invention. FIG. 2 is a schematic cross-sectional view showing a partition structure of the exhaust gas purifying filter shown in FIG. 1.

Here, a DPF which is an exhaust gas purifying filter used in a diesel engine for an automobile as the exhaust gas purifying filter will be described as the example.

The shape of the exhaust gas purifying filter 10 of the present embodiment is cylindrical, and is schematically configured of a filter substrate 11 which is formed of a porous ceramic having a plurality of micropores, a gas passage 12 which is formed in the filter substrate 11, and a porous film 13 which is provided on an inner wall surface 12a of an inflow cell 12A (exhaust gas inflow gas passage) in which an exhaust upstream side end is opened in the gas passage 12.

In addition, a cross-section (surface which is indicated by reference numeral a in FIG. 1) perpendicular with respect to the axial direction of the cylinder and a cross-section (surface which is indicated by reference numeral β in FIG. 1) parallel to the axial direction of the cylinder are shown in FIG. 1.

The filter substrate 11 is a honeycomb structure which is configured of heat-resistant porous ceramic such as silicon carbide, cordierite, aluminum titanate, or silicon nitride. The filter substrate 11 is schematically configured of a partition 14 and a plurality of cell-like gas passages 12 which are enclosed by the partition 14 and are disposed along the longitudinal direction (flow direction of exhaust gas), and becomes a honeycomb structure (lattice structure).

Moreover, in the filter substrate 11, among two ends perpendicular to the axial direction of the cylinder, one side end becomes an inflow surface (for example, surface indicated by the reference numeral α of FIG. 1) into which the exhaust gas including the particulate matter 30 flows and the other side end becomes an exhaust surface (for example, the side of the surface opposite to the surface which is indicated by the reference numeral α in FIG. 1) which exhausts the purified gas.

Here, the "honeycomb structure" in the present embodiment is a structure in which the plurality of gas passages 12 are formed so as to be parallel to one another in the filter substrate 11. In the drawings, the cross-sectional shape in a direction perpendicular to the axial direction of the gas passage 12 is a rectangular shape. However, the present invention is not limited thereto, and various cross-sectional shapes including a polygonal shape, a circular shape, an elliptical shape, or the like may be applied. In addition, a portion in the cross-sectional shape of the gas passage 12, which is disposed in the vicinity of the outer circumference of the filter substrate 11, is formed of an arc shape. This is the shape which is conveniently matched to the shape of the filter substrate 11, and due to the fact that the filter substrate includes the above-described shape, the filter substrate becomes a honeycomb structure in which the gas passages 12 are disposed up to the vicinity of the outer circumference of the filter substrate 11 without a gap.

The gas passage 12 is configured of a structure in which the upstream side end and the downstream side end are alternately occluded when viewed from the flow direction (longitudinal direction) of the exhaust gas. In addition, a plurality of micropores (pores) are formed in the inner portion of the partition 14 among the gas passages 12, and for example, the exhaust gas, which flows into the inflow cell 12A in which the exhaust upstream side end is opened, is discharged from the gas passage 12B (outflow gas passage) in which the lower side end is opened through the micropores of the partition 14. At this time, the particulate matter 30 is collected on the surface of the porous film 13.

It is preferable that the average pore diameter of the partition 14 which is configured of a porous ceramic be 5 μm or more and 50 μm or less. If the average pore diameter is less than 5 μm, it is not preferable since the pressure loss due to the partition 14 itself is increased. On the contrary, if the average pore diameter is more than 50 μm, it is not preferable since strength of the partition 14 is not sufficient or it is difficult to form the porous film 13 on the partition 14.

Figure 2:
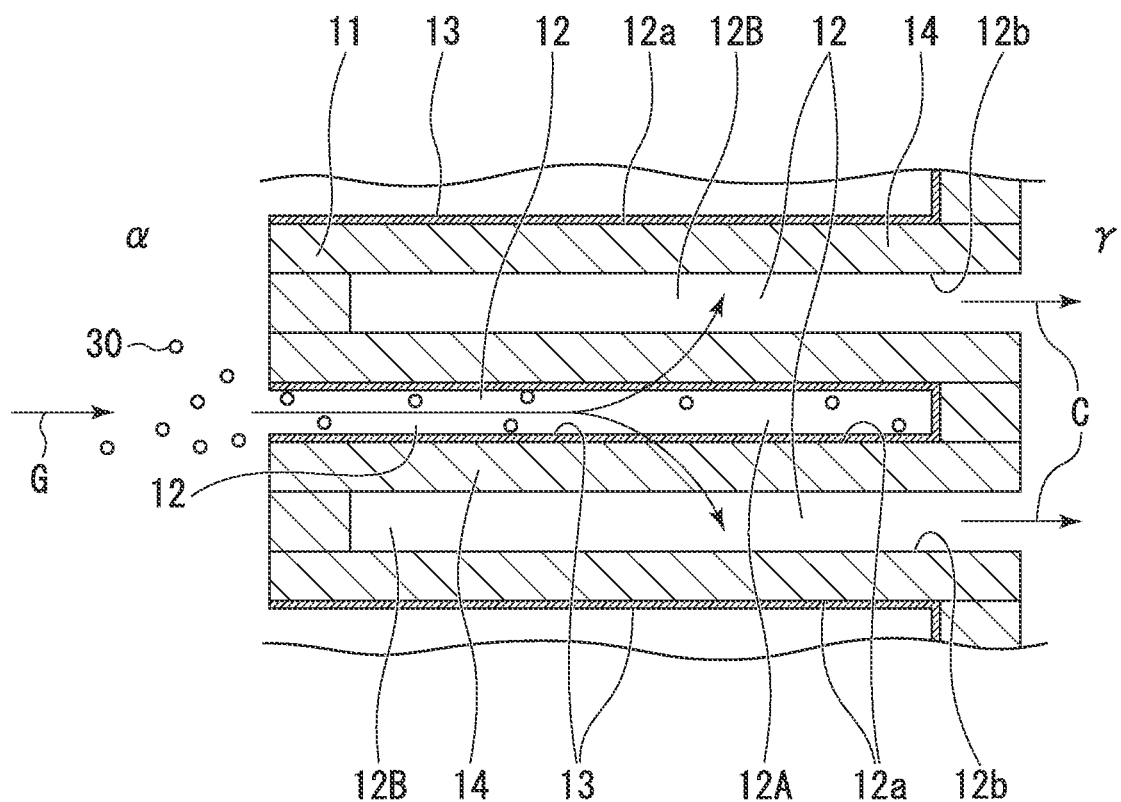
FIG. 2 is a cross-sectional view showing a partition structure according to the honeycomb structure type filter of the embodiment of the present invention.

FIG. 2 is a view enlarging the cross-section indicated by the reference numeral β in FIG. 1, and shows the flow of the exhaust gas which flows in from the inflow opening side (reference numeral β in FIG. 1) of the exhaust gas purifying filter 10, and the flow of the purified gas in which the exhaust gas passes through the partition 14, is purified, and is discharged to the discharge opening side (reference numeral γ side in FIG. 1).

The exhaust gas, which includes particle matter 30 flowing in from the inflow opening side, passes through the partition 14 of the filter substrate 11 in a course of flowing from the reference numeral α side to the reference numeral γ side in FIG. 2 in the inflow cell 12A. At this time, the particulate matter 30 contained in the exhaust gas is removed by the porous film 13, and the purified gas in which the particulate matter 30 is removed flows from the reference numeral a side to the reference numeral γ side and is finally discharged to the discharge opening in the gas passage 12B.

Figure 3:
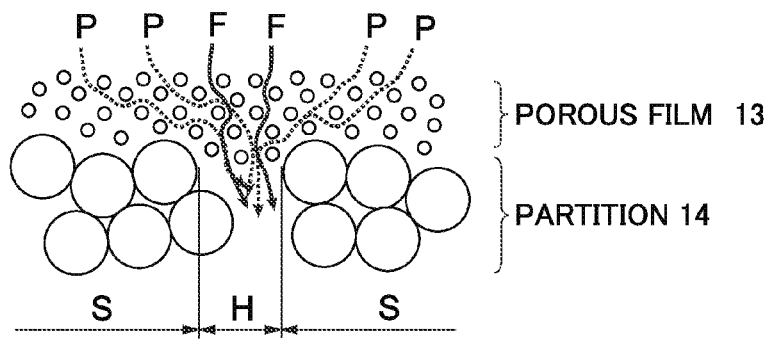
FIG. 3 is an enlarged view showing a cross-section of the partition structure according to the honeycomb structure type filter of the embodiment of the present invention.
Figure 3:
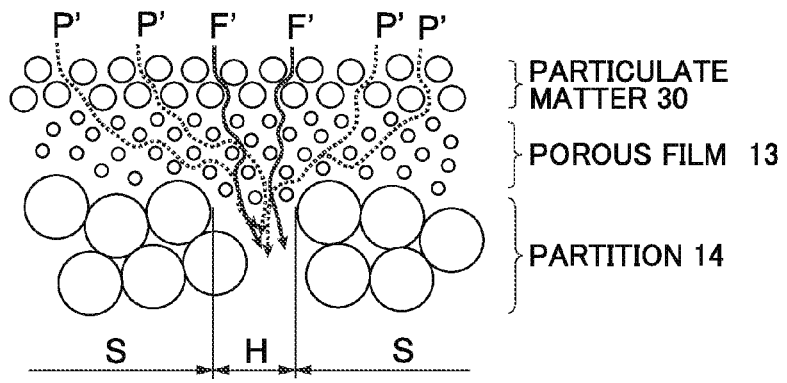
Figure 3:
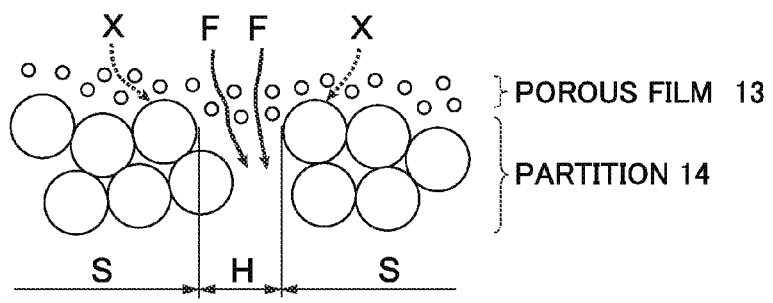
Figure 3:
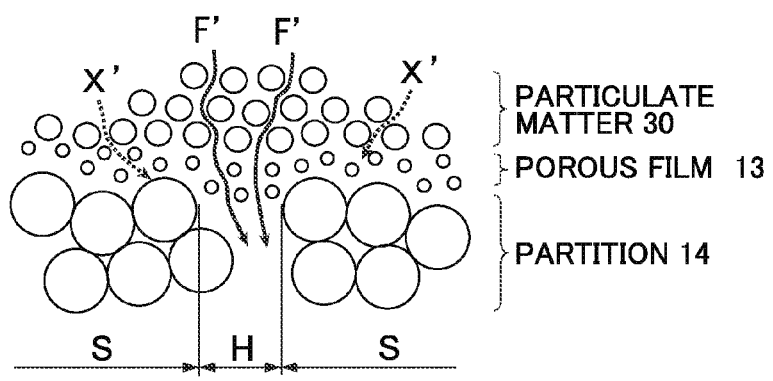

FIG. 3 is a view schematically showing the microstructure of the cross-section of the porous film 13 which is provided at the partition 14 and on the partition 14, and also shows the flows (passage) of the exhaust gas and the combustion gas.

Here, FIGS. 3(a) and 3(b) are in a state where the thickness of the porous film is within the range of the present embodiment as described below, FIG. 3(a) shows a state before the particulate matter 30 is collected, and FIG. 3(b) shows a state where the particulate matter 30 is collected on the porous film 13 and is deposited. In addition, FIGS. 3(c) and 3(d) are in a state where the thickness of the porous film is less than 5 μm, FIG. 3(c) shows a state before the particulate matter 30 is collected, and FIG. 3(d) shows a state where the particulate matter 30 is collected on the porous film 13 and is deposited.

[Porous Film]

In the exhaust gas purifying filter 10, the porous film 13 which includes the silicon carbide is provided on the inner wall surface 12a of the inflow cell 12A in which the exhaust upstream side end is opened. Here, that the porous film 13 includes the silicon carbide means that the porous film 13 is formed of silicon carbide particles.

The proportion of the silicon carbide in the porous film 13 is preferably 80 volume % or more, and is more preferably 90 volume % or more. As particles other than the silicon carbide which forms the porous film, according to the necessity, an element of at least one kind selected from group 3 to group 14 such as silicon (Si), aluminum (Al), zirconium (Zr), and titanium (Ti), or an oxide, a carbide, and a nitride thereof, may be solely contained or may be complexed and contained. These function as a sintering agent when sintering the silicon carbide particles which mainly from the porous film 13.

The porous film 13 is formed as a film which is independent on the inner wall surface 12a of the gas passage 12 without penetrating too much into the micropore of the porous body forming the filter substrate 11. That is, the porous film 13 is provided on the surface of the inner wall surface 12a of the gas passage 12 while penetrating up to only the inlet portion of the pore which is included in the partition 14.

In addition, the silicon carbide particles which form the porous film 13 may be not necessarily be configured of a silicon carbide simple substance, and may be particles which include the silicon carbide. For example, the silicon carbide particles may be composite particles which are configured of silicon carbide, and an element of at least one kind selected from 3 group to 14 group or an oxide, a carbide, and a nitride thereof. In addition, boron (B) may be also used as the sintering agent.

With respect to the average pore diameter, the pore diameter distribution, the average porosity, the average primary particle diameter of the particles which form the porous film, the thickness, and the shape of the porous film 13, including the following properties is suitable from the standpoint of suppression of the pressure loss, improvement of the combustion efficiency, or the like.

[Average Pore Diameter and Pore Diameter Distribution of Porous Film]

The porous film 13 includes a plurality of pores, the pores communicate with one another, and as a result, the porous film configures a filter-like porous material including penetrating holes.

In the pore diameter distribution of the porous film 13, pores with the pore diameter of 0.01 μm or more and 3.0 μm or less are 70% or more of total volume of the pores, and pores with the pore diameter of 0.01 μm or more and 3.0 μm or less are 5% or more and 90% or less of total volume of the pores. Moreover, in the pore diameter distribution of the porous film 13, pores with the pore diameter of 0.01 μm or more and 3.0 μm or less are preferably 15% or more and 80% or less of total volume of the pores.

In the pore diameter distribution of the porous film 13, pores with the pore diameter of 0.01 μm or more and 3.0 μm or less are more preferably 15% or more and 50% or less of total volume of the pores. In addition, in the pore diameter distribution of the porous film 13, pores with the pore diameter of 0.01 μm or more and 3.0 μm or less are preferably 80% or more of total volume of the pores.

In the exhaust gas purifying filter 10 of the present invention, in the pore diameter distribution of the porous film 13, 70% or more of total volume of the pores is in a range of the pore diameter of 0.01 μm or more and 3.0 μm or less, and the pore diameter of 0.01 μm or more and 3.0 μm or less is 5% or more and 90% or less of total volume of the pores. In this way, due to the fact that the ratio between the pore diameter of 0.01 μm or more and 0.3 μm or less and the pore diameters outside this range becomes a specific range, it is possible to suppress the increase in the pressure loss while maintaining the collection efficiency of the particulate matter 30, particularly, it is possible to suppress the increase ratio of the pressure loss, which is generated according to the deposition of the particulate matter 30 at the time of use, to be lower. In addition, at the time of the regeneration of the exhaust gas purifying filter 10, the combustion gas uniformly contacts the particulate matter 30 on the porous film 13, the heat exchange between the particulate matter and the combustion gas passing through the porous film is effectively operated, it is possible to burn and remove the particulate matter 30 in a short period of time, and the combustion efficiency can be improved. Moreover, due to the fact that the pore distribution is in the range of the present invention, small pores and large pores coexist in the porous film, and a result, strength of the film is increased, and a film which can withstand practical use even in the film having high porosity can be formed.

It is considered that this is due to the fact that contact portions between the particles which configure the porous film 13 can be strengthened by combining small pores such as 0.01 μm or more and 0.3 μm or less and large pores outside this range, the increase in the pressure loss can be suppressed due to the effects of large pores and small pores, and the combustion gas can uniformly contact the particulate matter 30.

When the pore diameter of 0.01 μm or more and 0.3 μm or less is less than 5% of total volume of the pores, because the sintering temperature needs a higher temperature in order to obtain the strength of the porous film, and the material of the filter substrate is limited, the use of cordierite, aluminum titanate, and the like other the silicon carbide is limited or the porosity is decreased, both the collection efficiency and the combustion efficiency are incompatible. In addition, when the pore diameter of 0.01 μm or more and 0.3 μm or less is more than 90% of total volume of the pores, the pressure loss is increased. When 70% or more of total volume of the pores is not in the range of the pore diameter of 0.01 μm or more and 3.0 μm or less, the ratio of the pores which are more than 3.0 μm is increased, the strength is decreased, portions through which gas easily passes and portions through which gas does not easily pass are generated on the porous film 13, the combustion gas cannot uniformly contact the particulate matter 30 on the porous film 13, and the combustion efficiency at the time of the regeneration is decreased.

It is preferable that the average pore diameter at the range of 0.3 μm or more and 3 μm or less be 1.0 μm or more and 2.5 μm or less. Due to the fact that the pore diameter in the range of 0.3 μm or more and 3 μm or less has the above-described distribution, the combination effect with the pore diameter of 0.01 μm or more and 0.3 μm or less is further improved.

In addition, it is preferable that the pore diameter distribution of the porous film 13 be a peak shape of a so-called "two-peak distribution" which each has the peak in the range of 0.01 μm or more and 0.3 μm or less and the range of 0.3 μm or more and 3 μm or less. Due to the fact that the pore diameter distribution has the peak shape of the "two-peak distribution", the film strength is further improved.

[Average Porosity of Porous Film]

The average porosity of the porous film 13 is preferably 50% or more and 90% or less, and is more preferably 60% or more and 85% or less.

When the average porosity of the porous film 13 is less than 50%, since the average porosity of the porous film 13 is equal to or less than the porosity of the filter substrate 11 (partition 14), the increase in the pressure loss is generated, and there is a concern that the costs may be increased. On the other hand, if the average porosity of the porous film is more than 90%, there is a concern that the structure or the strength of the porous film may be difficult to maintain.

[Average Primary Particle Diameter of Porous Film]

The porous film 13 is preferably configured of silicon carbide particles having an average primary particle diameter of 5 nm or more and 5000 nm or less, and is more preferably configured of silicon carbide particles having an average primary particle diameter of 20 nm or more and 4000 nm or less.

The reason why it is preferable that the porous film 13 be configured of silicon carbide particles having an average primary particle diameter of 5 nm or more and 5000 nm or less is the following. If the average primary particle diameter of the silicon carbide particles is less than 5 nm, since a degree of crystallization of the silicon carbide particles is lower, it is difficult to obtain durability in a high temperature environment. On the other hand, if the average primary particle diameter of the silicon carbide particles is more than 5000 nm, it is difficult to maintain the strength of the porous film, and improvement in the combustion efficiency of the particulate matter 30 is decreased when the reproduction processing of the exhaust gas purifying filter 10 is performed.

[Thickness of Porous Film]

The thickness (film thickness) of the porous film 13 is 60 μm or less in a portion which is planarly overlapped with a hole portion which is included to the partition in the inner wall surface 12a, and is 5 μm or more and 60 μm or less in a portion which is planarly overlapped with a solid portion of the partition in the inner wall surface 12a.

Here, the "hole portion" indicates an opening which is provided by connecting the end of the micropore of the porous body constructing the partition 14 to the inner wall surface 12a, and corresponds to an H portion in FIG. 3. Here, the thickness of the porous film 13 at a portion located on a micropore (the portion in which the micropore overlaps with the porous film 13), wherein the micropore indicates a micropore opened to the inner wall surface 12a, not a micropore of the inner portion of the partition 14, is discussed Moreover, the "solid portion" indicates a portion in which the ceramic portion is directly exposed to the inner wall surface 12a and the ceramic portion excluding the hole portion among partitions which is a portion of the filter substrate 11, which is the porous ceramic, and corresponds to an S portion in FIG. 3.

The thickness of the porous film 13 is preferably 35 μm or less in the hole portion and 7 μm or more and 35 μm or less in the solid portion. The thickness of the porous film is more preferably 30 μm or less in the hole portion and 10 μm or more and 30 μm or less in the solid portion.

The preferred thickness range is due to the following reasons.

First, when the particulate matter 30 is collected in the exhaust gas purifying filter 10, the exhaust gas penetrates from the inflow cell 12A side to the hole portion of the partition 14, and passes through the inflow cell 12B side. Thereby, a passage of the exhaust gas which connects the surface of the porous film 13 and the hole portion of the partition 14, for example, an F of FIG. 3(a) is formed on the portion in which the porous film 13 is overlapped with the hole portion of the partition 14.

Here, if the thickness of the porous film 13 is 5 μm or more, as shown in FIG. 3(a), a sufficient amount of the micropores for forming the passage which connects the surface of the porous film 13 and the hole portion of the partition 14 is present in the porous film 13 in the place in which the porous film 13 is planarly overlapped with the solid portion of the partition 14. Therefore, the passage of the exhaust gas which connects the surface of the porous film 13 and the hole portion of the partition 14, for example, a P in FIG. 3(a) is also formed in the place in which the porous film 13 is planarly overlapped with the solid portion of the partition 14. Due to the fact that the passage is formed, the pressure loss is decreased, and the particulate matter 30 is uniformly collected on the porous film 13.

In addition, even in the case where the regeneration processing of the filter is performed by burning the particulate matter 30, since the passage of the combustion gas is similarly formed as indicated by F' and P' in FIG. 3(*b*), the combustion gas can uniformly flow in the particulate matter 30, and therefore, the combustion efficiency can be improved.

However, if the thickness of the porous film 13 is less than 5 μm, as shown in FIG. 3(*c*), the distance (thickness) from the upper surface of the porous film 13 to the inner wall surface 12*a* becomes smaller, and the number of the micropores in the porous film 13 is decreased. Therefore, in the place in which the porous film 13 is planarly overlapped with the solid portion of the partition 14, for example, like an X in FIG. 3(*c*), it is difficult to form the passage of the exhaust gas which connects the surface of the porous film 13 and the hole portion of the partition 14, and there is a concern that the pressure loss may be increased. Moreover, since the particulate matter 30 is collected only at, in the porous film 13, the portion which is overlapped with the hole portion and the collection becomes non-uniform, the collection efficiency is quickly decreased, and there is a concern that an increase in the frequency of the regeneration processing may be generated.

Moreover, similarly, since the number of the micropores in the porous film 13 is decreased, as shown in FIG. 3(*d*), when the regeneration processing is performed by burning the particulate matter 30, there is a concern that the combustion efficiency of the particulate matter 30 may not be improved.

In addition, if the thickness of the porous film 13 is more than 60 μm, when the exhaust gas including the particulate matter 30 flows into the exhaust gas purifying filter 10, the pressure loss due to the porous film 13 is increased. On the other hand, since the combustion efficiency of the particle matter 30 when performing the regeneration processing is not improved at all compared to the case where the thickness of the porous film 13 is 60 μm or less, there is a concern that a decrease in the output of the engine on which the exhaust gas purifying filter of the present invention is mounted may be generated.

According to above-described reasons, the optimal range of the thickness of the porous film 13 is set.

[Surface Shape of Porous Film]

It is preferable that the surface of the porous film 13 be equally provided so as to be approximately parallel to the inner wall surface 12*a*. That is, on the inner wall surface 12*a*, in a concave-convex pattern is formed so as to hold the shape of the particles which construct the partition 14. However, it is preferable that the surface of the porous film 13 be a substantially flat surface while almost none of the surface profile of the inner wall surface 12*a* is reflected to the surface of the porous film 13. In the present specification, in this way, the state where the surface of the porous film 13 substantially becomes an even surface is referred to as "uniformly". In the present specification, in this way, the state where the surface of the porous film and a plane surface which represents the inner wall surface 12*a* substantially becomes parallel is referred to as an "approximately parallel".

For example, when the surface shape of the porous film 13 has a concave-convex pattern according to the surface profile of the inner wall surface 12*a*, and the portion in which the porous film overlapped with the hole portion is concaved to such a degree that the formation of the passage of the exhaust gas which connects the surface of the porous film 13 and the hole portion of the partition 14 is prevented in the portion which is planarly overlapped with the portions other than the hole portion of the partition 14, it is difficult to form the passage of the exhaust gas which connects the surface of the porous film 13 and the hole portion of the partition 14, and there is a concern that the pressure loss may be increased. In this case, the particulate matter 30 collected by the porous film 13 is easily accumulated in the concave portion, and as a result, since occlusion is formed at the position in which the porous film is overlapped with the hole portion through which the exhaust gas passes, there is a concern that the pressure loss may be generated. However, if the surface is uniformly formed as described above, the particulate matter 30 is collected on the entire surface of the porous film 13, localization of the collection is not generated, and therefore, the pressure loss is not easily generated.

The exhaust gas purifying filter 10 of the present embodiment is configured as described above.

[Method of Manufacturing Exhaust Gas Purifying Filter]

Next, a method of manufacturing the exhaust gas purifying filter 10 will be described.

The exhaust gas purifying filter of the present embodiment can be manufactured by a step which coats a coating material for forming a porous film containing particles, which include at least silicon carbide, on the surface of the partition constructing the gas passage of the filter, that is, on the surface of the porous support having micropores of 5 to 50 μm in average pore diameter, and a step which forms the porous film on the surface of the porous support by sintering the particles including at least silicon carbide by heat treatment.

According to this method, for example, it is possible to manufacture the filter with improving productivity compared to the method in which the gas dispersing the particles flows into the filter substrate and the porous film is formed, or the like.

As the silicon carbide particles which are the material for forming the porous film 13, the particles which are obtained from a silica reduction method, an Acheson method, a thermal plasma method, a silica precursor calcinations method, or the like are used. The silicon carbide particles obtained in this manner are dispersed in a dispersion medium to be silicon carbide particle dispersion liquid.

It is preferable that the dispersion process uses a wet method. In addition, either of an opened disperser or a closed disperser may be used as the disperser which is used in the wet method, and for example, a ball mill, an agitation mill, and the like are used. As the ball mill, a rolling mill, a vibrating mill, a planetary mill, and the like are included. In addition, as the agitation mill, a tower mill, an agitation tank mill, a flow tube mill, a tubular mill, and the like are included.

Basically, water or an organic solvent is suitably used as the dispersion medium. However, in addition to those, a polymer monomer, a simple substance of an oligomer, and the mixture thereof are also used.

As the organic solvent, for example, alcohols such as methanol, ethanol, propanol, diacetone alchol, furfuryl alcohol, ethylene glycol, and hexylene glycol; esters such as acetic acid methyl ester and acetic acid ethyl ester; ether alcohols such as diethyl ether, ethylene glycol monomethyl ether (methyl cellosolve), ethylene glycol monoethyl ether (ethyl cellosolve), ethylene glycol monobutyl ether (butyl cellosolve), and diethylene glycol monomethyl ether; ethers such as dioxane and tetrahydrofuran; ketones such as acetone, methyl ethyl ketone, acetyl acetone, and acetoacetic acid esters; acid amides such as N,N-dimethylformamide; aromatic hydrocarbons such as toluene and xylene; or the like are suitably used, and one kind or two kinds or more of the solvents may be used.

Acrylic or methacrylic monomers such as methyl acrylate and methyl methacrylate, epoxy monomers, or the like are used as the polymer monomer.

Moreover, as the oligomer, urethane acrylate oligomer, epoxy acrylate oligomer, acrylate oligomer, or the like are used.

In addition, a surface modification of the silicon carbide particles may be performed in order to enhance affinity between the silicon carbide particles and the dispersion medium. As the surface modification agent, 3-aminopropyl trimethoxsilane, 3-aminopropyl triethoxysilane, cysteamine, tetramethylammonium hydroxide, aminoethanediol, and the like are included. However, the present invention is not limited thereto provided that surface modification agent includes a functional group adsorbed to the surface of the silicon carbide particle and an end group having affinity to the dispersion medium.

In addition, a dispersing agent or a binder may be added to the silicon carbide particle dispersion liquid obtained as described above.

For example, as the dispersing agent or the binder, Polycarboxylic acid ammonium salt, or organic polymers such as polyethylene glycol, polyvinyl alcohol, or polyvinylpyrrolidone, and the like are used.

Subsequently, the silicon carbide particle coating liquid is prepared by adding resin, which is dissolved in the water or the organic solvent in advance, to the silicon carbide particle dispersion liquid, agitating, and mixing.

As the organic solvent, the same organic solvent as those described for the above silicon carbide particle dispersion can be used.

For example, water-soluble cellulose ether, nitrocellulose, gelatin, uerangamu, agar, acrylic resin, or the like is used as the resin, Subsequently, the silicon carbide particle coating liquid is coated on the inner wall surface of the partition 14 of the filter substrate 11, that is, on the inner wall surface 12a of the inflow cell 12A side of the gas passage 12, and the coating film is formed. In addition, the exhaust gas purifying filter 10 in which the porous film 13 is provided on the inner wall surface 12a of the gas passage 12 of the filter substrate 11 is obtained by performing heat treatment of the coating film.

As the coating method of the silicon carbide particle coating liquid, a bar coating method, a slip casting method, a dip coat method, a general wet coat method in which the coating liquid is coated on the surface of the object to be processed, or the like is used.

The heat treatment temperature of the coating film is preferably 900° C. or more and 2000° C. or less, and is more preferably 1000° C. or more and 1800° C. or less.

In addition, the heat treatment time is preferably 0.5 hours or more and 10 hours or less, and is more preferably 1 hour or more and 4 hours or less.

Moreover, although the heat treatment atmosphere is not particularly limited, the heat treatment of the coating film may be performed in a reducing atmosphere such as hydrogen and carbon monoxide; in an inert atmosphere such as nitrogen, argon, neon, and xenon; or in an oxidizing atmosphere such as oxygen or air.

The exhaust gas purifying filter of the present embodiment can be manufactured as described above. Particularly, in order to make the pore diameter of 0.01 μm or more and 3.0 μm or less be 70% or more of total volume of the pores and the pore diameter of 0.01 μm or more and 0.3 μm or less be 5% or more and 90% or less of total volume of the pores in the pore diameter distribution of the porous film 13, it is preferable to control the following points.

A first point is controlling of the average primary particle diameter of the particles which form the porous film. A correlation between the primary particle diameter and the pore diameter of the raw material particle is high, particularly, in order to achieve the preferable peak shape of the "two-peak distribution" in the present embodiment, it is preferable to combine and use two kinds or more of particles in which the ranges (particle diameter distributions) of the primary particle diameter are different from one another. For example, an amount of 5% or more and 60% or less of particulates having the primary particle diameter of 0.01 μm or more and 0.30 μm or less, and an amount of 40% or more and 95% or less of particulates having the primary particle diameter of more than 0.30 μm and 10 μm or less can be combined.

A second point is controlling of the average secondary particle diameter of the particles which form the porous film in the dispersing liquid or the coating liquid. When the collection of the particles is generated while the secondary particle diameter is not preferably controlled, the pores having excessive diameter may be generated. For example, the average secondary particle diameter in the dispersing liquid or the coating liquid of the present embodiment may be 1.0 μm or more and 15 μm or less.

A third point is the heat treatment condition such as the heat treatment temperature or the time of the coating film.

A fourth point is a component or amount of the material which is mainly added as the sintering agent.

The third and the fourth points influence the connection state between particles including the silicon carbide which configures the coating film, that is, the sintering state of the coating film. If the sintering state is excessive for the formation of the porous film, since the connection portions between particles are increased, the decrease in the pore diameter or the porosity is generated. On the other hand, if the sintering state is insufficient, the strength which is required in the porous film 13 cannot be obtained. In addition, since the third and the fourth conditions have various combinations, it is difficult to indicate the conditions in an unambiguous index. A preferable porous film 13 can be obtained by controlling the four points.

In this way, in the exhaust gas purifying filter of the present invention, the porous film 13 including the silicon carbide is provided on the surface of the porous partition which is constructed of the filter substrate, in the pore diameter distribution of the porous film, pores with the pore diameter of 0.01 μm or more and 3.0 μm or less are 70% or more of total volume of the pores, and pores with the pore diameter of 0.01 μm or more and 0.3 μm or less are 5% or more and 90% or less of total volume of the pores.

Thereby, it is possible to suppress the increase in the pressure loss while maintaining the collection efficiency of the particulate matter 30, particularly, it is possible to suppress the increase ratio of the pressure loss of the exhaust gas purifying filter to be lower when the particulate matter 30 is deposited on the surface of the inflow cell 12A side at the time of use. Therefore, in a vehicle on which the exhaust gas purifying filter of the present invention is mounted, it is possible to decrease the load when the vehicle is driven.

In addition, it is possible to suppress the increase ratio of the pressure loss according to the deposition of the particulate matter 30 at the time of use to be lower. Therefore, a large amount of particulate matter 30 can be deposited on the filter, and it is possible to lengthen the interval in the regenerating cycle of the filter.

In addition, if the regeneration of the filter is performed by burning the deposited particulate matter after depositing a large amount of particulate matter 30, thermal runaway due to the combustion of the particulate matter 30 is generated and damage to the filter due to the sudden increase of the temperature is easily generated. However, in the case of the exhaust gas purifying filter of the present invention, since the filter is formed of the porous film which includes the silicon carbide, the thermal runaway is suppressed due to the following reasons, and it is possible to prevent the temperature from being suddenly increased.

First, in the case of the honeycomb filter (non-processed honeycomb filter) formed of the silicon carbide in which the porous film is not provided on the inner wall surface, when the particulate matter 30 (mainly composed of carbon such as soot), which is deposited in the honeycomb pores and collected by a deep-bed filtration, is burned, since the particulate matter 30 is suddenly burned, the temperature in the surface of the filter is suddenly increased.

However, in the case of the porous film which includes the silicon carbide, all particulate matter 30 is collected by a surface layer filtration, not the deep-bed filtration. Thereby, since the combustion gas for burning the particulate matter 30 is uniformly supplied to the particulate matter 30 and the contact between the particulate matter 30 and the porous film is favorably maintained because the contact area between the particulate matter and the porous film is large to generate the heat exchange between the particulate matter and the porous film, and therefore, the particulate matter is burned in an uniform heating state. Therefore, abnormal combustion in which the particulate matter 30 is suddenly burned is suppressed.

In addition, since the combustion gas flows into and passes through the porous film from the entire surface of the porous film, the heat exchange between the deposited particulate matter 30 and the combustion gas effectively operates, and it is possible to burn and remove the particulate matter 30 in a short period of time.

Therefore, in the vehicle on which the exhaust gas purifying filter of the present invention is mounted, the pressure loss is suppressed, and it is possible to regenerate the filter in a short period of time without damaging the filter. As a result, the fuel consumption can be improved.

In addition, it is possible to increase the strength of the porous film, and a porous film capable of withstanding practical use can be formed even when the film having high porosity is formed.

Moreover, this embodiment exemplifies the exhaust gas purifying filter 10 in which the porous film 13 is provided on the inner wall surface 12a of the gas passage 12. However, the exhaust gas purifying filter of the present invention is not limited thereto. In the exhaust gas purifying filter of the present invention, a decomposition-promoting catalyst which promotes the decomposition of the particulate matter 30 or a gaseous substance may be carried on the porous film in the inner wall surface of the gas passage.

As the form of the carrying, the porous film and the decomposition-promoting catalyst film which promotes the decomposition of the particulate matter 30 or the gaseous matter may be mixed. That is, the porous film is provided on inner wall surface at the inflow side of the gas passage, and the decomposition-promoting catalyst film may be provided on the porous film. In addition, the decomposition-promoting catalyst film is provided on inner wall surface at the inflow side of the gas passage, and the porous film may be provided on the decomposition-promoting catalyst film. Alternatively, the decomposition-promoting catalyst film is provided on the inner wall surface of the gas passage, and the porous film may be provided on the decomposition-promoting catalyst film. In addition, the decomposition-promoting catalyst film is further provided on the porous film. In addition, the decomposition-promoting catalyst may be laminated on or included in the inner wall surface of the micropores of the porous film 13.

In addition, the porous film may be a composite of the particles which at least include the decomposition-promoting catalyst and the particles which form the porous film 13.

As described above, the preferred embodiments according to the present invention are described with reference to the accompany drawings. However, it is needless to say that the present invention is not limited to the related embodiments. Various shapes, the combination, and the like of each component member shown in the above-described example are only one example, and various changes can be performed based on the design demand or the like within the range which does not depart the gist of the present invention.

EXAMPLE

Hereinafter, the present invention is specifically described according to Examples and Comparative Examples. However, the present invention is not limited to the Examples. Moreover, in the description below, the formed filter is referred to as the exhaust gas purifying filter.

[Evaluation of Physical Properties of Exhaust Gas Purifying Filter]

In the exhaust gas purifying filters which are obtained according to Examples 1 to 8 and Comparative Examples 1 to 4 below, the thickness, each measurement and test such as the pore diameter, and the average porosity of the porous film, a pressure loss test, a thermal runaway evaluation test, a combustion test, and a strength test were performed according to the following listed methods, and the evaluation of the exhaust gas purifying filter of the present invention was performed.

(1) Thickness of Porous Film

An electron microscopy image of the porous film of the exhaust gas purifying filter was obtained by breaking the partition of the exhaust gas purifying filter and observing the cross-section of the partition through a field emission-type scanning electron microscope (FE-SEM)S-4000 (made by Hitachi Instruments Service Co.).

With a magnification of 400 times, the ten-point values was obtained by measuring the thicknesses at 0.1 mm intervals over 1 mm in the length of the cross-section of the porous film in each of the portions in which the porous film is overlapped with the particle surface (solid portion) and the micropore portion (hole portion) of the exhaust gas purifying filter and was averaged to set the thickness of the porous film of each position.

(2) Pore Diameter and Average Porosity of Porous Film

The pore diameter distribution was measured by using a mercury porosimeter (Pore Master 60GT made by Quantachrome Co.), and the ratio of the volume of the pore diameter of 0.01 μm or more and 3.0 μm or less and the ratio of the volume of the pore diameter of 0.01 μm or more and 0.3 μm or less were obtained with respect to the total volume of the pores of the porous film. In addition, in the range in which the pore diameter was 0.3 μm or more and 3.0 μm or less, 50% accumulation from 3.0 μm toward 0.3 μm was set to the average pore diameter in the range of 0.3 μm or more and 3.0 μm or less of the pore diameter. In addition, the average porosity was measured by using the same apparatus.

(3) Pressure Loss Test

Dried air having a flow rate of 100 liters/minute flowed in from the inflow opening side of the exhaust gas purifying filter, the dried air passed through the partition of the exhaust gas purifying filter and was discharged from the discharge opening side, and the pressure loss for the inflow opening side was measured at this time.

The prepared exhaust gas purifying filter was mounted on a diesel engine having an air volume displacement of 2.2 L and the engine was driven at an engine speed of 1500 rpm, PM (particulate matter included in the exhaust gas) of 3 g/L was deposited in the exhaust gas purifying filter, and (the pressure loss of the exhaust gas purifying filter in which the PM of 3 g/L was deposited)/(the pressure loss of the initial (before the deposition) exhaust gas purifying filter substrate) was obtained.

If the obtained value was 4 or less, the filter was good. Particularly, the filter was very good (○) when the value was 3 or less, was good (Δ) when the value was more than 3 and 4 or less, and was poor (x) when the value was more than 4.

(4) Thermal Runaway Evaluation

Each exhaust gas purifying filter was mounted on a diesel engine having an air volume displacement of 2.2 L and the engine was driven at an engine speed of 1500 rpm, and particulate matter of 2 g/L was deposited in the exhaust gas purifying filter.

Subsequently, after heating the exhaust gas purifying filter in which the particulate matter was deposited up to 600° C. in a nitrogen atmosphere, the particulate matter was burned by introducing the mixed gas consisting of 3.8% of oxygen, 200 ppm of nitric monoxide (NO), and nitrogen as the remainder at the flow rate of 13.5 liters/minute while maintaining the temperature. In the combustion processing, from the time the oxygen was introduced, (amount of combusted particulate matter/amount of residual particulate matter) was measured at each regeneration time (second), which was set to the index of the thermal runaway property.

In the combustion processing, an amount of the carbon dioxide and the carbon monoxide was measured by using MEXA-7500D made by HORIBA. From a total amount of the carbon included in the detected carbon dioxide and the carbon monoxide, the amount of combusted particulate matter and the amount of residual particulate matter in the particulate matter were calculated at each regeneration time.

In the effect evaluation, ○ was indicated when a sudden combustion peak did not exist within 100 seconds after starting the combustion and variation per unit time (%/s) of the amount of combusted particulate matter/the amount of residual particulate matter was 0.2 or more, and x was indicated when the value was less than 0.2.

(5) Combustion Test

Each exhaust gas purifying filter was mounted on a diesel engine having an air volume displacement of 2.2 L and the engine was driven at an engine speed of 1500 rpm, and particulate matter was deposited in the exhaust gas purifying filter.

Subsequently, after heating the exhaust gas purifying filter in which the particulate matter was deposited up to 600° C. in a nitrogen atmosphere, the particulate matter was burned by introducing the mixed gas consisting of 3.8% of oxygen, 200 ppm of nitric monoxide (NO), and nitrogen as the remainder at the flow rate of 13.5 liters/minute while maintaining the temperature. In the combustion processing, the time from when the oxygen was introduced to when the deposited particulate matter was destroyed so as to be 10% of the total deposited amount was measured, and the measured time was set to the index of the particulate matter combustibility.

In the combustion processing, an amount of the carbon dioxide and the carbon monoxide was measured by using MEXA-7500D made by HORIBA. A total amount of the carbon included in the detected carbon dioxide and the carbon monoxide corresponded to the entire deposition amount of the particulate matter, and from the accumulation amount of the carbon dioxide and the accumulation amount of the carbon monoxide the time until the residual amount of the particulate matter became 10% of the entire deposition amount was calculated.

When the value obtained only by the filter substrate was the reference (100), the relative value of the measured time was calculated. The combustion of the particulate matter was promoted more as the relative value became smaller. It was determined to be very effective (○) when the time was shortened to 20% or more, it was determined to be effective (Δ) when the time was shortened to 10 to 20%, and it was determined to be noneffective (x) when the time was shortened to less than 10%.

(6) Strength Test

Based on JIS-K5600-5-4 (General Test Method of Coating Material, Part 5: Mechanical Property of Coating Film, and Section 4: Scratch Hardness (Pencil Method)), the surface of the porous film was scratched by using a stainless steel rod of φ2 mm instead of the pencil, appearance of damage to the porous film was visually observed, and strength was determined from the change of the appearance.

At the time of the test, the tester was once slid on the porous film while making the load applied to the stainless steel rod be 500 g; it was determined to be ○ (good) when the peeling of the porous film was not present, to be average (Δ) when the there was some peeling of the porous film, and to be poor (x) when the porous film was significantly detached.

Example 1

95 mass % of the silicon carbide particles having an average particle diameter of 0.8 μm and 5 mass % of the silicon carbide particles having an average particle diameter of 0.02 μm were weighed, whereby a mixture of the silicon carbide particles was adjusted. Subsequently, 1 part by mass of alumina particles having an average particle diameter of 0.2 μm was added as the sintering agent with respect to 100 parts by mass of the silicon carbide particles, whereby ceramic particles which were a mixture of the silicon carbide particles and the alumina particles were adjusted.

Subsequently, the content of ceramic particles was measured so as to be 9.0 volume %, the content of water was measured so as to be 89.0 volume %, and the content of gelatin as the gelling agent was measured so as to be 2.0 volume %. In addition, after the ceramic particles and the pure water were put into an agitator and mixed over 12 hours at the rotational speed of 60 rpm in a ball mill so as to be the dispersing liquid, the gelatin was added to the dispersing liquid and these were mixed over 15 minutes to obtain the coating liquid.

Subsequently, after the filter substrate (honeycomb filter formed of silicon carbide: DPF, average pore diameter is 12 μm and average porosity is 45% in partition) was immersed into the coating liquid, the filter structure was lifted up and dried at 100° C. over 12 hours, and the coating film of the ceramic particles was formed on the surface of the filter substrate.

Subsequently, the filter substrate on which the ceramic particles were coated was put into an atmosphere furnace, the atmosphere in the furnace was made to be an argon atmosphere, the temperature in the furnace was increased up to 1700° C. at a speed of 15° C. per minute, and the filter substrate was held over 2 hours and sintered to manufacture the exhaust gas purifying filer of Example 1.

Example 2

90 mass % of the silicon carbide particles having an average particle diameter of 0.8 μm and 10 mass % of the silicon carbide particles having an average particle diameter of 0.03 μm were weighed, whereby mixture of the silicon carbide particles was adjusted. Subsequently, 1.5 parts by mass of alumina particles having an average particle diameter of 0.2 μm was added as the sintering agent with respect to 100 parts by mass of the silicon carbide particles, whereby ceramic particles were adjusted.

Subsequently, the amount of ceramic particles was measured so as to be 6.5 volume %, the amount of water was measured so as to be 92.0 volume %, and the amount of the gelling agent was measured so as to be 1.5 volume %. As the gelling agent, water-soluble cellulose ether (trade name: Metolose, solid content: 10 mass %, made by Shin-Etsu Chemical Co.), which was dissolved in water in advance, was used. In addition, after the ceramic particles and the pure water were mixed over 3 hours at the rotational speed of 60 rpm in a ball mill so as to be the dispersing liquid, the water-soluble cellulose ether was added to the dispersing liquid and these were mixed over 15 minutes to obtain the coating liquid.

Subsequently, after the filter substrate was immersed into the coating liquid, the filter substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1800° C. at a speed of 15° C. per minute, and the filter substrate was held over 4 hours and sintered to manufacture the exhaust gas purifying filer of Example 2.

Example 3

94 mass % of the silicon carbide particles having an average particle diameter of 0.6 μm and 6 mass % of the silicon carbide particles having an average particle diameter of 0.035 μm were weighed, whereby mixture of the silicon carbide particles was adjusted. Subsequently, 2 parts by mass of yttria particles having an average particle diameter of 0.1 μm was added as the sintering agent with respect to 100 parts by mass of the silicon carbide particles, whereby ceramic particles which were a mixture of the silicon carbide particles and the yttria particles were adjusted.

Subsequently, the amount of ceramic particles was measured so as to be 5.0 volume %, the amount of water was measured so as to be 90.0 volume %, and the amount of gelatin was measured so as to be 5.0 volume %. In addition, after the ceramic particles and the pure water were mixed over 2 hours at the rotational speed of 60 rpm in a ball mill so as to be the dispersing liquid, the gelatin was added to the dispersing liquid and these were mixed over 15 minutes to obtain the coating liquid.

Subsequently, after the filter substrate was immersed into the coating liquid, the filter substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1000° C. at a speed of 15° C. per minute, and the filter substrate was held over 1 hour and sintered to manufacture the exhaust gas purifying filer of Example 3.

Example 4

90 mass % of the silicon carbide particles having an average particle diameter of 0.6 μm and 10 mass % of the silicon carbide particles having an average particle diameter of 0.04 μm were weighed, whereby mixture of the silicon carbide particles was adjusted. Subsequently, 3 parts by mass of alumina particles having an average particle diameter of 0.2 μm was added as the sintering agent with respect to 100 parts by mass of the silicon carbide particles, whereby ceramic particles were adjusted.

Subsequently, the amount of ceramic particles was measured so as to be 17.0 volume %, the amount of water was measured so as to be 80.0 volume %, and the amount of the gelatin was measured so as to be 3.0 volume %, and after the ceramic particles and the pure water were mixed over 3 hours at the rotational speed of 60 rpm in a ball mill so as to be the dispersing liquid, gelatin was added to the dispersing liquid and these were mixed over 15 minutes to obtain the coating liquid.

Subsequently, after the filter substrate was immersed into the coating liquid, the substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1750° C. at a speed of 15° C. per minute, and the filter substrate was held over 2 hours and sintered to manufacture the exhaust gas purifying filer of Example 4 was manufactured.

Example 5

20 mass % of the silicon carbide particles having an average particle diameter of 0.6 μm and 80 mass % of the silicon carbide particles having an average particle diameter of 0.02 μm were weighed, whereby mixture of the silicon carbide particles was adjusted. Subsequently, 1 part by mass of yttria particles having an average particle diameter of 0.1 μm was added as the sintering agent with respect to 100 parts by mass of the silicon carbide particles, whereby ceramic particles were adjusted.

Subsequently, the amount of ceramic particles were measured so as to be 20.0 volume %, the amount of water was measured so as to be 75.0 volume %, and the amount of the gelatin was measured so as to be 5.0 volume %, and after the ceramic particles and the pure water were mixed over 3 hours at the rotational speed of 60 rpm in a ball mill so as to be the dispersing liquid, gelatin was added to the dispersing liquid and these were mixed over 15 minutes to obtain the coating liquid.

Subsequently, after the filter substrate was immersed into the coating liquid, the substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1800° C. at a speed of 15° C. per minute, and the filter substrate was held over 2 hours and sintered to the exhaust gas purifying filer of Example 5 was manufactured.

Example 6

20 mass % of the silicon carbide particles having an average particle diameter of 0.6 μm and 80 mass % of the silicon carbide particles having an average particle diameter of 0.03 μm were weighed, whereby mixture of the silicon carbide particles were adjusted. Subsequently, 3 parts by mass of alumina particles having an average particle diameter of 0.2 μm was added as the sintering agent with respect to 100 parts by mass of the silicon carbide particles, whereby ceramic particles were adjusted.

Subsequently, the amount of ceramic particles was measured so as to be 35.0 volume %, the amount of water was measured so as to be 60.0 volume %, and the amount of the gelatin was measured so as to be 5.0 volume %. In addition, after the ceramic particles and the pure water were mixed over 6 hours at the rotational speed of 60 rpm in a ball mill so as to be the dispersing liquid, the gelatin was added to the dispersing liquid and these were mixed over 15 minutes to obtain the coating liquid.

Subsequently, after the filter substrate was immersed into the coating liquid, and the substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1600° C. at a speed of 15° C. per minute, and the filter substrate was held over 3 hours and sintered to manufacture the exhaust gas purifying filer of Example 6.

Example 7

94 mass % of the silicon carbide particles having an average particle diameter of 1.2 μm and 6 mass % of the silicon carbide particles having an average particle diameter of 0.03 μm were weighed, whereby mixture of the silicon carbide particles were adjusted. Subsequently, 1 part by mass of alumina particles having an average particle diameter of 0.2 μm was added as the sintering agent with respect to 100 parts by mass of the silicon carbide particles, whereby the ceramic particles were adjusted.

Subsequently, the amount of ceramic particles were measured so as to be 7.0 volume %, the amount of water was measured so as to be 92.0 volume %, and the amount of the gelatin was measured so as to be 1.0 volume %, and after the ceramic particles and the pure water were mixed over 12 hours at the rotational speed of 60 rpm in a ball mill so as to be the dispersing liquid, gelatin was added to the dispersing liquid and these were mixed over 15 minutes to the coating liquid.

Subsequently, after the filter substrate was immersed into the coating liquid, and the substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1700° C. at a speed of 15° C. per minute, and the filter substrate was held over 2 hours and sintered to manufacture the exhaust gas purifying filer of Example 7.

Example 8

94 mass % of the silicon carbide particles having an average particle diameter of 2.3 μm and 6 mass % of the silicon carbide particles having an average particle diameter of 0.03 μm were weighed, whereby a mixture of the silicon carbide particles was adjusted. Subsequently, 1 part by mass of yttria particles having an average particle diameter of 0.1 μm was added as the sintering agent with respect to 100 parts by mass of the silicon carbide particles, whereby ceramic particles were adjusted.

Subsequently, the amount of ceramic particles were measured so as to be 9.0 volume %, the amount of water was measured so as to be 90.0 volume %, and the amount of the gelatin was measured so as to be 1.0 volume %, and after the ceramic particles and the pure water were mixed over 12 hours at the rotational speed of 60 rpm in a ball mill so as to be the dispersing liquid, gelatin was added to the dispersing liquid and these were mixed over 15 minutes to the coating liquid.

Subsequently, after the filter substrate was immersed into the coating liquid, and the substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1750° C. at a speed of 15° C. per minute, and the filter substrate was held over 1 hour and sintered to manufacture the exhaust gas purifying filer of Example 8.

The porous diameter distributions of the porous films which were obtained from Examples 1 to 8 had the peaks in the range of 0.01 μm or more and 0.3 μm or less and the range of 0.3 μm or more and 3 μm or less.

Comparative Example 1

94 mass % of the silicon carbide particles having an average particle diameter of 5.5 μm and 6 mass % of the silicon carbide particles having an average particle diameter of 0.03 μm were weighed, whereby mixture of the silicon carbide particles was adjusted. Subsequently, 2 parts by mass of alumina particles having an average particle diameter of 0.2 μm was added as the sintering agent with respect to 100 parts by mass of the silicon carbide particles, whereby ceramic particles was adjusted.

Subsequently, the amount of ceramic particles were measured so as to be 7.0 volume %, the amount of water was measured so as to be 91.5 volume %, and the amount of the gelatin was measured so as to be 1.5 volume %, and after the ceramic particles and the pure water were mixed over 12 hours at the rotational speed of 60 rpm in a ball mill so as to be the dispersing liquid, gelatin was added to the dispersing liquid and these were mixed over 15 minutes to coating liquid.

Subsequently, after the filter substrate was immersed into the coating liquid, and the substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 1750° C. at a speed of 15° C. per minute, and the filter substrate was held over 1 hour and sintered to manufacture the exhaust gas purifying filer of Comparative Example 1.

Comparative Example 2

1 part by mass of boron carbide particles having an average particle diameter of 0.8 μm was added as the sintering agent with respect to 100 parts by mass of the silicon carbide particles in 100 mass % of the silicon carbide particles having an average particle diameter of 0.6 μm, whereby ceramic particles were adjusted.

Subsequently, the amount of ceramic particles was measured so as to be 7.0 volume %, the amount of water was measured so as to be 90.0 volume %, and the amount of the gelling agent was measured so as to be 3.0 volume %. As the gelling agent, water-soluble cellulose ether (trade name: Metolose, solid content: 10 mass %, made by Shin-Etsu Chemical Co.), which was dissolved in water in advance, was used. In addition, after the ceramic particles and the pure water were mixed over 12 hours at the rotational speed of 60 rpm in a ball mill so as to be the dispersing liquid, the water-soluble cellulose ether was added to the dispersing liquid and was mixed over 15 minutes to obtain the coating liquid.

Subsequently, after the filter substrate was immersed into the coating liquid over 3 minutes, and the filter substrate was lifted up and dried at 100° C. over 12 hours, the filter substrate on which the ceramic particles were coated was put into an atmosphere furnace, the atmosphere in the furnace was made to be an argon atmosphere, the temperature in the furnace was increased up to 2000° C. at a speed of 15° C. per minute, and the filter substrate was held over 1 hour and sintered to manufacture the exhaust gas purifying filer of Comparative Example 2.

Comparative Example 3

100 mass % of silicon carbide particles having an average particle diameter of 0.02 μm was used as the ceramic particle.

Subsequently, the amount of ceramic particles was measured so as to be 10.0 volume %, the amount of water was measured so as to be 87.0 volume %, and the amount of the gelling agent was measured so as to be 3.0 volume %. As the gelling agent, water-soluble cellulose ether (trade name: Metolose, solid content: 10 mass %, made by Shin-Etsu Chemical Co.), which was dissolved in water in advance, was used. In addition, after the ceramic particles and the pure water were mixed over 12 hours at the rotational speed of 60 rpm in a ball mill so as to be the dispersing liquid, the water-soluble cellulose ether was added to the dispersing liquid and was mixed over 15 minutes to obtain the coating liquid.

Subsequently, after the filter substrate was immersed into the coating liquid over 3 minutes, and the filter substrate was lifted up and dried at 100° C. over 12 hours, the filter substrate on which the ceramic particles was coated was put into an atmosphere furnace, the atmosphere in the furnace was made to be an argon atmosphere, the temperature in the furnace was increased up to 900° C. at a speed of 5° C. per minute, and the filter substrate was held over 3 hours and sintered to manufacture the exhaust gas purifying filer of Comparative Example 3.

Comparative Example 4

100 mass % of silicon carbide particles having an average particle diameter of 20 μm was used as the ceramic particle.

Subsequently, the amount of ceramic particles was measured so as to be 30.0 volume %, the amount of water was measured so as to be 67.0 volume %, and the amount of the gelling agent was measured so as to be 3.0 volume %. As the gelling agent, water-soluble cellulose ether (trade name: Metolose, solid content: 10 mass %, made by Shin-Etsu Chemical Co.), which was dissolved in water in advance, was used. In addition, after the ceramic particles and the pure water were mixed over 12 hours at the rotational speed of 60 rpm in a ball mill so as to be the dispersing liquid, the water-soluble cellulose ether was added to the dispersing liquid and was mixed over 15 minutes to obtain the coating liquid was obtained.

Subsequently, after the filter substrate was immersed into the coating liquid over 3 minutes and the filter substrate was lifted up and dried at 100° C. over 12 hours, the filter substrate on which the ceramic particles was coated was put into an atmosphere furnace, the atmosphere in the furnace was made to be an argon atmosphere, the temperature in the furnace was increased up to 1300° C. at a speed of 5° C. per minute, and the filter substrate was held over 3 hours and sintered to manufacture the exhaust gas purifying filer of Comparative Example 4.

Evaluation results of the exhaust gas purifying filters obtained according to the Examples and Comparative Examples are shown in Table 1.

TABLE 1

| | Volume Ratio (%) in Each Pore Diameter Range | | | Average Pore Diameter of | Film Thickness (μm) | | Average Porosity (%) | Pressure Loss Characteristic | Combustion Characteristic | Strength | Thermal Runaway |
|---|---|---|---|---|---|---|---|---|---|---|---|
| | 0.01-3.0 μm | 0.01-0.3 μm | 0.3-3.0 μm | 0.3-3.0 μm (μm) | On Solid Portion | On Hole Portion | | | | | |
| Example 1 | 78.2 | 5.2 | 73 | 2.4 | 16 | 51 | 78 | Δ | Δ | ○ | ○ |
| Example 2 | 89.2 | 8.2 | 81 | 2.0 | 15 | 56 | 82 | Δ | Δ | ○ | ○ |
| Example 3 | 92.5 | 22.5 | 70 | 1.4 | 14 | 49 | 81 | ○ | ○ | ○ | ○ |
| Example 4 | 87.4 | 17.4 | 70 | 2.0 | 19 | 57 | 69 | ○ | ○ | ○ | ○ |
| Example 5 | 82.9 | 36.9 | 46 | 2.4 | 13 | 27 | 66 | ○ | ○ | ○ | ○ |
| Example 6 | 91.4 | 48.4 | 43 | 1.8 | 6 | 11 | 56 | ○ | ○ | ○ | ○ |
| Example 7 | 97.6 | 72.6 | 25 | 2.0 | 8 | 21 | 81 | ○ | Δ | Δ | ○ |
| Example 8 | 99.8 | 85.8 | 14 | 2.0 | 10 | 17 | 77 | ○ | Δ | Δ | ○ |
| Comparative Example 1 | 53 | 11.4 | 41.6 | 4.0 | 12 | 17 | 79 | ○ | X | Δ | ○ |
| Comparative Example 2 | 100 | 0 | 100 | 1.2 | 5 | 10 | 81 | Δ | Δ | X | ○ |
| Comparative Example 3 | 100 | 100 | 0 | — | 7 | 12 | 78 | X | X | Δ | ○ |
| Comparative Example 4 | 42 | 0 | 42 | 4.0 | 4 | 8 | 58 | ○ | X | X | X |

In Examples 1 to 8, the increase ratio in the pressure loss was decreased even though the particulate matter was deposited, the thermal runaway was suppressed, and the exhaust gas purifying filters having improved combustion property were obtained. In addition, as a result of the strength test, the peeling of the porous film was suppressed, and it was found that the exhaust gas purifying filters having high practical strength were obtained.

On the other hand, in Comparative Example 1, although the increase in the pressure loss was suppressed, the combustion characteristic was deteriorated, and the combustion time of the particulate matter could not be shortened.

In Comparative Example 2, although the increase in the pressure loss was suppressed and the suppression effect to the thermal runaway and the combustion characteristic were good, it was found that the formed porous film was easily peeled and weakened from the strength test and the exhaust gas purifying filter of Comparative Example 2 was unavailable.

In Comparative Example 3, the pressure loss was increased, and it was not found the combustion characteristic was improved.

In Comparative Example 4, although the increase in the pressure loss was suppressed, the suppression effect to the thermal runaway was not found, and the combustion characteristic was not good. In addition, it was found that the formed porous film was easily peeled and weakened from the strength test.

According to the above-described results, in the exhaust gas purifying filter (honeycomb structure type filter) of the present embodiment, it was confirmed that both the higher collection efficiency of the particulate matter and the lower pressure loss were compatible and the combustion time of the particulate matter could be shortened, and usefulness of the present invention was confirmed.

INDUSTRIAL APPLICABILITY

In the vehicle on which the exhaust gas purifying filter of the present invention is mounted, the pressure loss is suppressed, and it is possible to regenerate the filter in a short period of time without damaging the filter. As a result, since the fuel consumption can be improved, the present invention is industrially very useful.

REFERENCE SIGNS LIST

10: DPF, 11: filter substrate, 12: gas passage, 12A: inflow cell, 12B: outflow cell, 13: porous film, 14: partition, 30: particulate matter, α, γ: end surface, G: exhaust gas, C: purified gas, H: hole portion, S: solid portion, F, F': exhaust gas passage or combustion gas passage which is formed in the porous film on hole portion, P, P': exhaust gas passage or combustion gas passage which is formed in the porous film on solid portion, X, X': portion in which gas passage is not formed.

We claim:
1. An exhaust gas purifying filter comprising:
an inflow surface into which exhaust gas including particulate matter flows;
an exhaust surface which exhausts purified gas; and
a filter substrate which is constructed of a porous body, in which the filter substrate includes a porous partition and a gas passage which is enclosed by the porous partition, and a porous film which includes silicon carbide is provided on a surface of the porous partition, wherein
in a pore diameter distribution of the porous film, pores with the pore diameter of 0.01 μm or more and 3.0 μm or less are 70% or more of total volume of the pores, and pores with the pore diameter of 0.01 μm or more and 0.3 μm or less are 5% or more and 90% or less of total volume of the pores, the pore diameter distribution having a peak in the range of 0.01 μm or more and 0.3 μm or less and a range of 0.3 μm or more and 3.0 μm or less.

2. The exhaust gas purifying filter according to claim 1, wherein the gas passage has an inflow cell in which an exhaust upstream side end is opened,
the porous film is provided so as to cover a hole portion and a solid portion of the partition in the inflow cell, and
a thickness of the porous film is 60 μm or less in a position which is planarly overlapped with the hole portion and is 5 μm or more in a position which is planarly overlapped with the solid portion.

3. The exhaust gas purifying filter according to claim 1 or 2, wherein the porous film is provided with a surface of the porous film in a uniform state.

4. The exhaust gas purifying filter according to claim 1 or 2, wherein an average porosity of the porous film is 50% or more and 90% or less.

5. The exhaust gas purifying filter according to claim 3, wherein an average porosity of the porous film is 50% or more and 90% or less.

* * * * *